United States Patent
Rohlfing

(10) Patent No.: US 7,925,608 B2
(45) Date of Patent: Apr. 12, 2011

(54) FAULT DIAGNOSTICS

(75) Inventor: David M Rohlfing, Ipswich (GB)

(73) Assignee: British Telecommunications public limited company, London (GB)

(*) Notice: Subject to any disclaimer, the term of this patent is extended or adjusted under 35 U.S.C. 154(b) by 718 days.

(21) Appl. No.: 11/885,752

(22) PCT Filed: Mar. 3, 2006

(86) PCT No.: PCT/GB2006/000567
§ 371 (c)(1),
(2), (4) Date: Sep. 6, 2007

(87) PCT Pub. No.: WO2006/097675
PCT Pub. Date: Sep. 21, 2006

(65) Prior Publication Data
US 2008/0168018 A1    Jul. 10, 2008

(30) Foreign Application Priority Data
Mar. 18, 2005 (EP) .................................. 05251672

(51) Int. Cl.
*G06N 5/02* (2006.01)
(52) U.S. Cl. ......................................................... 706/47
(58) Field of Classification Search ................ 706/47
See application file for complete search history.

(56) References Cited

U.S. PATENT DOCUMENTS

| | | | | |
|---|---|---|---|---|
| 5,852,814 A * | 12/1998 | Allen | ............................... | 706/13 |
| 6,947,797 B2 * | 9/2005 | Dean et al. | ....................... | 700/79 |
| 7,206,965 B2 * | 4/2007 | Roddy et al. | ..................... | 714/25 |
| 7,643,928 B2 * | 1/2010 | Soucy | ............................ | 701/100 |
| 2002/0007356 A1 * | 1/2002 | Rice et al. | ........................ | 706/47 |
| 2003/0004777 A1 | 1/2003 | Phillips | | |

OTHER PUBLICATIONS

Case-based reasoning model applied to information retrieval, Ramirez, C.; Cooley, R.; Case Based Reasoning: Prospects for Applications, IEE Colloquium on Digital Object Identifier: 10.1049/ic:19950323 Publication Year: 1995, pp. 9/1-9/3.*

Automated semantic annotation and retrieval based on sharable ontology and case-based learning techniques, Von-Wun Soo; Chen-Yu Lee; Chung-Cheng Li; Shu Lei Chen; Ching-chih Chen; Digital Libraries, 2003. Proceedings. 2003 Joint Conference on Digital Object Identifier: 10.1109/JCDL.2003.1204844 Publication Year: 2003, pp. 61-72.*

(Continued)

*Primary Examiner* — Michael Holmes
(74) *Attorney, Agent, or Firm* — Nixon & Vanderhye P.C.

(57) ABSTRACT

A method of fault diagnostics in a case based reasoning system, wherein said case based reasoning system comprises a plurality of cases, each case having an associated solution and a case weight, said method comprising the steps of: receiving data associated with a fault; determining a case match indicative of the degree of matching between the received data and each of the plurality of cases; providing a solution associated with one of the plurality of cases in dependence on its case match and case weight; receiving an actual solution to the fault; increasing the case weight of the case associated with the provided solution if the actual solution is equal to the provided solution; and adding a new case to the plurality of cases if the actual solution is not equal to the provided solution, wherein the actual solution is associated with the new case.

12 Claims, 6 Drawing Sheets

OTHER PUBLICATIONS

Development of the intelligent dust chamber bag control system using Case-Based reasoning, Kim, Jung-Sook; Information Sciences and Interaction Sciences (ICIS), 2010 3rd International Conference on Digital Object Identifier: 10.1109/ICICIS.2010.5534766 Publication Year: 2010 , pp. 546-551.*

Reuse of modular software with automated comment analysis, Matwin, S.; Ahmad, A.; Software Maintenance, 1994. Proceedings., International Conference on Digital Object Identifier: 10.1109/ICSM.1994.336772 Publication Year: 1994 , pp. 222-231.*

International Search Report mailed May 15, 2006 in International Application No. PCT/GB2006/000567.

Lewis, "Case Based Reasoning in Network Fault Management Systems," Managing Computer Networks: A Case-Based Reasoning Approach, No. Chapter 5, 1995, pp. 121-191.

Written Opinion of the International Searching Authority (pp. 1-2) issued in International Application No. PCT/GB2006/000567.

Office Action (pp. 1-4) dated Jan. 10, 2008 issued in European Application No. 06 709 804.6.

* cited by examiner

| CASE NUMBER | SOLUTION | CASE WEIGHT |
|---|---|---|
| Case 1 | Solution 1 | 17 |
| Case 2 | Solution 2 | 4 |
| Case 3 | Solution 3 | 3 |
| . | . | . |
| Case N | Solution N | N |

| ATTRIBUTE | MATCH TYPE | VALUE | RELATIVE WEIGHT |
|---|---|---|---|
| Attribute 1 | Match type 1 | Value 1 | Relative weight 1 |
| Attribute 2 | Match type 2 | Value 2 | Relative weight 2 |
| Attribute 3 | Match type 3 | Value 3 | Relative weight 3 |
| . | . | . | . |
| Attribute X | Match type X | Value X | Relative weight X |

| Case number | Solution | Case weight | Decayed case weight | Effective decay | Comment |
|---|---|---|---|---|---|
| Case 1 | Solution A | 1500 | 1050 | 0.7 | Plenty of recent cases |
| Case 2 | Solution A | 600 | 150 | 0.25 | Some old cases |
| Case 3 | Solution A | 2300 | 115 | 0.05 | Plenty of very old cases |
| Case 4 | Solution A | 1600 | 1440 | 0.9 | Plenty of very recent cases |
| Case 5 | Solution B | 2000 | 1900 | 0.95 | Plenty of very recent cases |
| Case 6 | Solution B | 500 | 300 | 0.6 | Some recent cases |
| Case 7 | Solution B | 700 | 210 | 0.3 | Many old cases |
| Case 8 | Solution C | 2150 | 537.5 | 0.25 | Plenty of old cases |
| Case 9 | Solution C | 400 | 220 | 0.55 | Some recent cases |
| Case 10 | Solution D | 1250 | 62.5 | 0.05 | Plenty of very old cases |

Figure 7

| Solution | Sum of case weights | Sum decayed case weight |
|---|---|---|
| Solution A | 6000 | 2755 |
| Solution B | 3200 | 2410 |
| Solution C | 2550 | 757.5 |
| Solution D | 1250 | 62.5 |

Figure 8

| Case number | Solution | Case score | Weighted case score | Decayed weighted case score | Normalised weighted case score | Normalised decayed weighted case score |
|---|---|---|---|---|---|---|
| Case 1 | A | 0.2 | 300 | 210 | 0.05 | 0.076 |
| Case 2 | A | 0.1 | 60 | 15 | 0.01 | 0.005 |
| Case 3 | A | 0.2 | 460 | 23 | 0.076667 | 0.008 |
| Case 4 | A | 0.2 | 320 | 288 | 0.053333 | 0.105 |
| Case 5 | B | 0.2 | 400 | 380 | 0.125 | 0.158 |
| Case 6 | B | 0.2 | 100 | 60 | 0.03125 | 0.025 |
| Case 7 | B | 1 | 700 | 210 | 0.21875 | 0.087 |
| Case 8 | C | 0.2 | 430 | 107.5 | 0.168627 | 0.142 |
| Case 9 | C | 1 | 400 | 220 | 0.156863 | 0.29 |
| Case 10 | D | 1 | 1250 | 62.5 | 1 | 1 |

Figure 9

| Case number | Solution | Case score | Weighted case score | Decayed weighted case score | Normalised weighted case score | Normalised decayed weighted case score |
|---|---|---|---|---|---|---|
| Case 1 | A | 1 | 1500 | 1050 | 0.25 | 0.381 |
| Case 2 | A | 0.1 | 60 | 15 | 0.01 | 0.005 |
| Case 3 | A | 0.2 | 460 | 23 | 0.076667 | 0.008 |
| Case 4 | A | 0.2 | 320 | 288 | 0.053333 | 0.105 |
| Case 5 | B | 1 | 2000 | 1900 | 0.625 | 0.788 |
| Case 6 | B | 0.2 | 100 | 60 | 0.03125 | 0.025 |
| Case 7 | B | 0.2 | 140 | 42 | 0.04375 | 0.017 |
| Case 8 | C | 1 | 2150 | 537.5 | 0.843137 | 0.71 |
| Case 9 | C | 0.2 | 80 | 44 | 0.031373 | 0.058 |
| Case 10 | D | 0.2 | 250 | 12.5 | 0.2 | 0.2 |

Figure 10

FAULT DIAGNOSTICS

This application is the US national phase of international application PCT/GB2006/000567 filed 3 Mar. 2006 which designated the U.S. and claims benefit of EP 05251672.1, dated 18 Mar. 2005, the entire content of which is hereby incorporated by reference.

FIELD OF THE INVENTION

This invention relates to a method of fault diagnostics, in particular a method for fault diagnostics using case based reasoning in a telecommunications network.

BACKGROUND TO THE INVENTION

Faults in networks, such as broadband networks, are sadly all too common today. Diagnostic systems have been developed to help determine the cause of such faults and more importantly to propose solutions for fixing the faults. These diagnostic systems can operate with or without human intervention. For example, in some diagnostic systems, data can be obtained automatically from the network through sensors. In other systems, the data from the sensors may be supported by data obtained by a user or engineer observing symptoms of the fault. Similarly, the solutions proposed by the diagnostic system may be applied automatically by the network or presented to a user/engineer to apply manually.

Various methods can be used to process the data relating to the symptoms of a fault input into a diagnostic system. The methods attempt to determine the cause of the fault and more importantly, to propose a solution. These methods typically include use of decision trees, rules sets and other expert systems. However, perhaps the most resilient method used in diagnostic systems is case based reasoning.

Case based reasoning (CBR) is based on the principal that most new problems are similar to previously encountered problems. Consequently, solutions to previously encountered problems may also apply to new problems. In a CBR system, a collection of problems, commonly referred to as cases, and their associated solutions are stored in a database. Each case usually comprises data in the form of sets of questions and answers and an associated solution for the case. When a new problem is presented, the stored cases that most closely match the new problem are retrieved and their associated solutions proposed as potential solutions to the new problem.

In comparison to decision tree and rule based systems, which are not able to provide solutions to problems that they have not been specifically designed for, CBR systems can identify the closest cases when an exact match does not occur.

In an example of a diagnostic system based on CBR used in a help-desk environment, a helpdesk operator may ask a user specific questions relating to the problem encountered and then enter the answers into the system. The diagnostic system then processes the input data entered by the operator and provides a proposed solution based on previously stored cases.

Typically, the data encapsulated within the cases is obtained through the use of training data obtained from real problems and their known solutions. Experts within the domain of the problem may also provide data. Therefore, to maintain a diagnostic system to include new cases requires creating new data, uploading the data into the CBR database, and restarting the entire system. This process is both time consuming and requires input from an expert operator in identifying preferred exemplar cases. This means that updates are only done on a periodic basis, so CBR systems rarely reflect the latest data available.

Another problem encountered in diagnostic systems using CBR is noise. Noise manifests itself when multiple cases have differing input data but have identical solutions, and vice versa. Most CBR systems are unable to cope with noise effectively, tending only to operate efficiently with discrete cases.

U.S. Pat. No. 5,799,148 describes a CBR system adapted to overcome the problem of noise in a system. It does so by utilising a confidence function to map a similarity measurement for each retrieved case to a corresponding measure of how many different outcomes are likely given the level of similarity. A report of the existing cases that have the best measures of confidence are then provided in a list.

U.S. Pat. No. 5,586,218 describes a system that performs autonomous learning in a real world environment using case based reasoning. The system is tuned in response to an evaluation of how well it operates within its environment. Selection of a case is based on multiple measures employed in conjunction with random or pseudo-random selection criteria to induce experimentation and gather further information to help solve future problems.

SUMMARY OF THE INVENTION

It is the aim of embodiments of the present invention to address one or more of the above-stated problems.

According to one aspect of the present invention, there is provided a method of fault diagnostics in a case based reasoning system, wherein said case based reasoning system comprises a plurality of cases, each case having an associated solution and a case weight, said method comprising the steps of:
  i) receiving data associated with a fault;
  ii) determining a case match indicative of the degree of matching between the received data and each of the plurality of cases;
  iii) providing a solution associated with one of the plurality of cases in dependence on its case match and case weight;
  iv) receiving an actual solution to the fault;
  v) increasing the case weight of the case associated with the provided solution if the actual solution is equal to the provided solution; and
  vi) adding a new case to the plurality of cases if the actual solution is not equal to the provided solution, wherein the actual solution is associated with the new case.

Advantageously, as new cases and their solutions are encountered, they can be added automatically to the system. As such, new cases are derived directly from faults that have actually occurred so that the system is continuously "trained". There is no need for manual updating of the diagnostic system with training data as all cases are fed back and used to train the system.

The use of case based reasoning also means that the reason behind why a particular solution was provided can be easily determined by examining the attributes of the case.

Preferably, the case weights associated with each of the plurality of cases are decayed over time. The decay over time may be periodic.

The use of positive reinforcement with cases that are successfully coupled with decaying of cases with time results in a significant advantage in that the diagnostic system is tuned into newer and more common cases, with older cases dropping away. Thus, the diagnostic system is automatically "trained" up to date and also becomes more accurate with time as it is automatically updated with each newly encountered case.

Preferably, the method further comprises normalising the results from step ii).

The method may further comprise determining a weighted case score based on the case match and the case weight for each of the plurality of cases, and wherein the solution provided in step iii) is in dependence on the weighted case score.

The normalising may comprise dividing the weighted case score for a case by the sum of the all case weights corresponding to the solution associated with said case.

The use of normalisation allows old cases that have had few recent matches, so are still relevant to still contribute as strongly as newer more common ones. In the situation where time decay is applied, older cases would simply be forgotten whether they are relevant or not.

Steps i) to vi) may be repeated in the method. In general, the higher the weighted case score of a case, the better the match between the case and the fault.

The method is generally employed for the diagnostics of faults in a telecommunications network, such as a broadband network.

According to a second embodiment of the present invention, there is provided a case based reasoning system for fault diagnostics comprising a processor, an input module adapted for receiving data associated with a fault, storage means storing a plurality of cases, each case having an associated solution and a case weight, wherein the processor is adapted for:
i) determining a case match indicative of the degree of matching between the received data and each of the plurality of cases;
ii) providing a solution associated with one of the plurality of cases in dependence on its case match and case weight;
iii) receiving an actual solution to the fault;
iv) increasing the case weight of the case associated with the provided solution if the actual solution is equal to the provided solution; and
v) adding a new case to the plurality of cases if the actual solution is not equal to the provided solution, wherein the actual solution is associated with the new case.

By using case based reasoning, the reasons behind why a particular solution was provided is retained by examining the case structure. This is not possible in other systems, such as ones based on neural networks.

When the system is used in broadband fault repair, operational costs can be significantly reduced. The manner in which the system is implemented makes it possible to encapsulate the knowledge held by field engineers who are actually involved in broadband repair in an extremely direct fashion.

BRIEF DESCRIPTION OF THE DRAWINGS

For a better understanding of the present invention reference will now be made by way of example only to the accompanying drawings, in which:

FIG. 7 is a table illustrating an example of cases with associated solutions, case weights and decayed case weights in an embodiment of the present invention;

FIG. 8 is a table illustrating an example of solutions with associated summed case weights for use in calculating normalised case scores in an embodiment of the present invention;

FIG. 9 is a table illustrating an example of cases with associated case scores and normalised case scores in an embodiment of the present invention;

FIG. 10 is a table illustrating a further example of cases with associated case scores and normalised case scores in an embodiment of the present invention.

DESCRIPTION OF PREFERRED EMBODIMENTS

The present invention is described herein with reference to particular examples. The invention is not, however, limited to such examples.

Figures 1, 2:
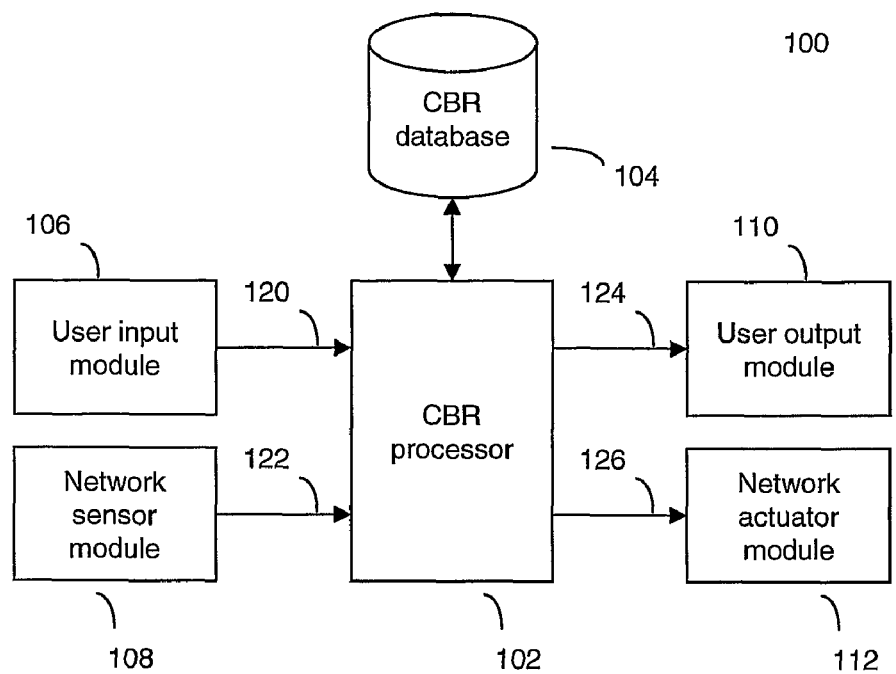
FIG. 1 is a schematic block diagram of a diagnostic system according to an embodiment of the present invention.
FIG. 2 is a table illustrating a collection of cases stored in a case database in an embodiment of the present invention.

FIG. 1 illustrates a diagnostic system 100 comprising a case based reasoning (CBR) processor 102 interconnected with a CBR database 104, a user input module 106, network sensor module 108, a user output module 110, and a network actuator module 112. The diagnostic system 100 is used to process input data 120 and 122 from the user input module 106 and the network sensor module 108 respectively. The user input module 106 and the network sensor module 108 provide information relating to faults in a telecommunications network, such as a broadband network. The CBR database 104 stores data relating to previously encountered faults and their associated solutions.

The user input module 106 may be any terminal such as a personal computer. For example a user, such as an engineer, may call a help desk to log a fault. The help desk operator may ask the user a series of predefined questions. The answers to the questions are keyed into the user input terminal 106. The questions and associated answers, which in a processing sense can be considered as attributes and associated values, form the basis of user input data 120. The user input data 120 is passed from the user input module 106 to the CBR processor 102.

In another example, the user input module 106 could be a terminal such as a laptop or PDA that is used directly by a user. Thus, in comparison to the help desk example, there is no intermediary of a further operator. Typically, such a situation may arise when an engineer is called out to inspect a potential fault, identifies the symptoms of the fault himself and inputs the data directly using his terminal.

The network sensor module 108 is capable of providing input data 122 obtained directly from the network. For example, the network input data 122 may include data relating to the type of service on the network, the bit rate of the service, the measured bit rate, the connection status and other such data. The network sensor module 108 passes the input data 122 onto the CBR processor 102.

The CBR processor 102 receives input data from the user input module 106 and the network sensor module 108 relating to a fault and processes the data with reference to the CBR database 104 to determine a proposed solution, or solutions, to the fault. The CBR database 104 stores case details relating to previously experienced faults. The solutions to the fault are then passed onto the user output module 110 and/or the network actuator module 112.

Solutions 124 passed to the user output module 110 can be provided to a user, for example via a help desk operator or directly to the user, who can attempt to fix the fault using the proposed solution. Solutions 126 passed to the network actuator module 112 can be used to directly apply changes to the network to assist with fixing the fault.

In practice, the actual method applied by the user to fix the fault may only be based on the proposed solution. For example, the solution may identify that the fault is to check the wiring of a specific connection or the solution may simply suggest that the fault is at a specific connection. The engineer may have to physically reconnect a cable or perform some rewiring based on this proposal. The aim is that the solution provided by the diagnostic system assists in the fixing of the fault, either directly or indirectly.

FIG. 2 illustrates a table 200 representing data stored in the CBR database 104. The table 200 shows a collection of cases, with a total of N cases, each represented by a unique case number 202. Each case number 202 has an associated solution 204 and case weight 206. Each case corresponds to a previously encountered fault and its solution. The case weight 206 gives a measure of how strong the case should be relied upon. In its simplest form, the case weight 206 may be a count of the number of times the case and its solution have been observed.

Figures 3, 4:
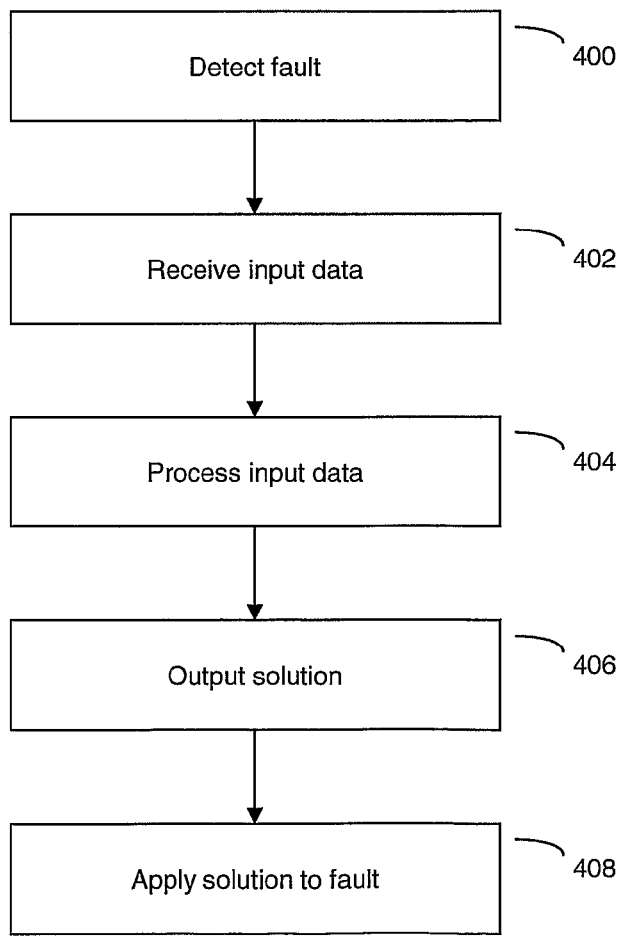
FIG. 3 is a collection of tables, each illustrating a case from a case database in an embodiment of the present invention.
FIG. 4 is a flow diagram illustrating the operational steps of a diagnostic system in an embodiment of the present invention.

FIG. 3 illustrates a collection of tables 300, 302 and 304, each representing data stored in the CBR database 104. Each table corresponds to a case and contains multiple records with attribute 310, match type 312, value 314 and relative weight 316 fields. In FIG. 3, case 1 is represented by table 300, case 2 by table 302, case 3 by table 304 and so on up to the total number of cases, N. The data in the attribute field 310 corresponds to the symptoms of a fault and thus also corresponds to the input data 120 and 122.

The operation of CBR processor 102 will now be described below with reference to FIG. 4 and FIG. 5.

In FIG. 4, at step 400, a new fault is detected by a user, who then calls a help desk. The help desk operator asks the customer a number of predefined questions. The answer to each question is input into the diagnostic system 100 by the operator via the user input module 106 in step 402. Additionally, in step 402, data may also be received directly from the network via the network sensor module 108.

The input data 120 and 122 from the user input module 106 and the network sensor module 108 respectively is processed by the CBR processor 102 in step 404 using the CBR database 104. The input data relating to each case, and consequently the case data stored in the CBR database and as shown in FIG. 3, can be considered as attributes with corresponding values.

In step 404, the input data is processed with reference to the CBR database 104 to determine a solution to the new fault. The processing in step 404 is illustrated in more detail in FIG. 5 as described below.

Figure 5:
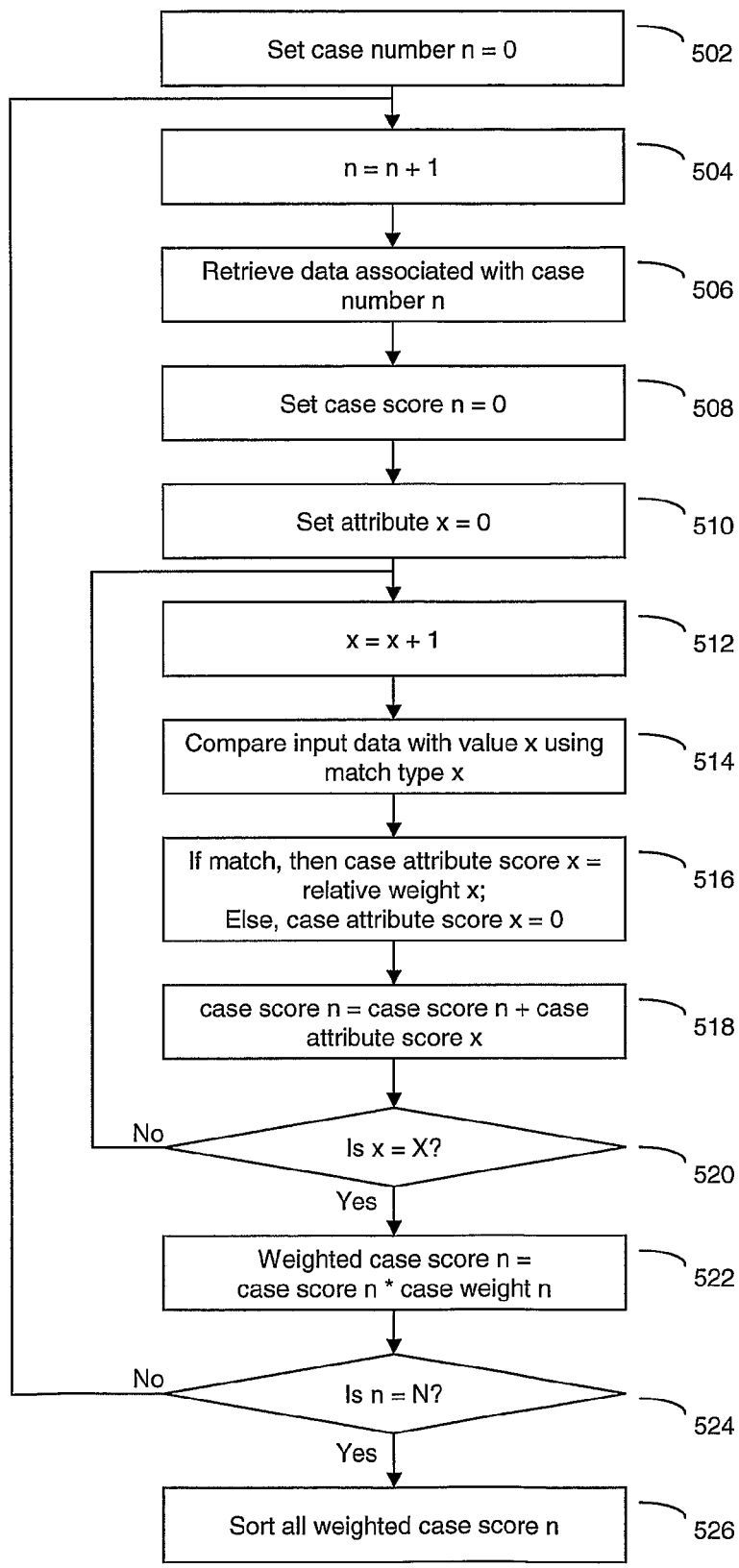
FIG. 5 is a flow diagram illustrating in detail the processing of input data in an embodiment of the present invention.

In FIG. 5, processing starts at step 502, where the case number n, which corresponds to the case number 202 in FIG. 2, is initially set to 0. In step 504, the 'case number n' is incremented by 1, and the data relating to the incremented 'case number n' is retrieved from the CBR database 104 in step 506, which includes 'solution n' and 'case weight n'. In step 508, 'case score n' is initialised to 0. Processing then continues with 'case number n'.

In step 510, 'attribute number x', corresponding to attribute 310 of 'case number n' in FIG. 3, is initially set to 0. In step 512, 'attribute x' is then incremented by 1, and the record associated with 'attribute x' is retrieved, which includes 'match type x', 'value x' and 'relative weight x' as shown in FIG. 3.

In step 514, the input data relating to the new fault corresponding to 'attribute x' is compared to the retrieved 'value x' using 'match type x'. The match type determines how the input data should be compared to the stored value to identify a match. For example, match type could be a Boolean operator such as "equal to" or "greater than".

In step 516, if there is a match, the 'case attribute score x' is set to the retrieved 'relative weight x'. If there is no match, the 'case attribute score x' is set to 0. The relative weight provides an indication of the importance of an attribute, where attributes of greater importance have a higher relative weight than those attributes of lesser importance. For most cases the relative weight of all the attributes will be set to 1. However, the relative weight could even be set to +/− infinity if a case should be forced or rejected based on a single attribute.

In step 518, a running score for case number n, represented by 'case score n', is maintained by adding the 'case attribute score x' to the current 'case score n'.

In step 520, a check is made to determine whether 'attribute x' is equal to the last attribute, 'attribute X'. Therefore, if x is not equal to X, then the next attribute is examined by repeating steps 504 to 518. This results in a 'case score n' that is a total score for 'case number n' made up of the individual relative weights from all successful matches.

In step 522, 'case score n' is multiplied by the 'case weight n' to give a 'weighted case score n'. As discussed above, 'case weight n' gives a measure of how strong 'case number n' should be relied upon. In the present example, the case weight is a count of the number of times the case and its solution have been previously observed. In another example, the case weight could also include a decay factor to gradually reduce the weighting of cases with time.

In step 524, a check is made to determine whether the present case being examined is equal to the last case, 'case N'. Therefore, if n is not equal to N, then the next case is examined by repeating steps 504 to 522. This results in a collection of weighted case scores, one for each case in stored the CBR database. In general, the higher the weighted score of a case, the more likely the solution associated with the case is going to be applicable to the present fault.

Therefore, in step 526, all the weighted case scores are sorted with the highest ranked first, resulting in a ranking of the cases and their associated solutions.

Now referring back to FIG. 4, the highest ranked solution is output in step 406 by the CBR processor to the user output module 110 and/or the network actuators 112. Alternatively, a collection of the highest ranked solutions may be presented. In step 408, the solution is used by the user to fix the fault or used to modify the network using the network actuator module 112.

In practice, when an engineer is presented with a list of possible solutions, the skills or capabilities of the engineer will affect which solution he decides to try first. In the case where network elements are automatically adjusted by the network actuator module 112, the solutions that are most applicable to the capabilities of the available elements will be attempted first.

In the above example, the attributes and values for a given case may be the same as for another case in the CBR database, or put another way, different faults may share the same symptoms. This is commonly referred to as noisy data. However, in such situations, the cases will differ in their solutions. The method in the above example is able to process noisy data and provides a number of solutions when appropriate, with the solutions ranked in order of their observed occurrences.

When a fault is fixed, the user can confirm the actual solution used to fix the fault. As such, the user feeds data back into the diagnostic system by either confirming that the solution used to fix the fault is the same as the proposed solution or by inputting a solution that was not proposed. The input solution may be selected from a list of existing predefined solutions or a new solution can be defined.

Figure 6:
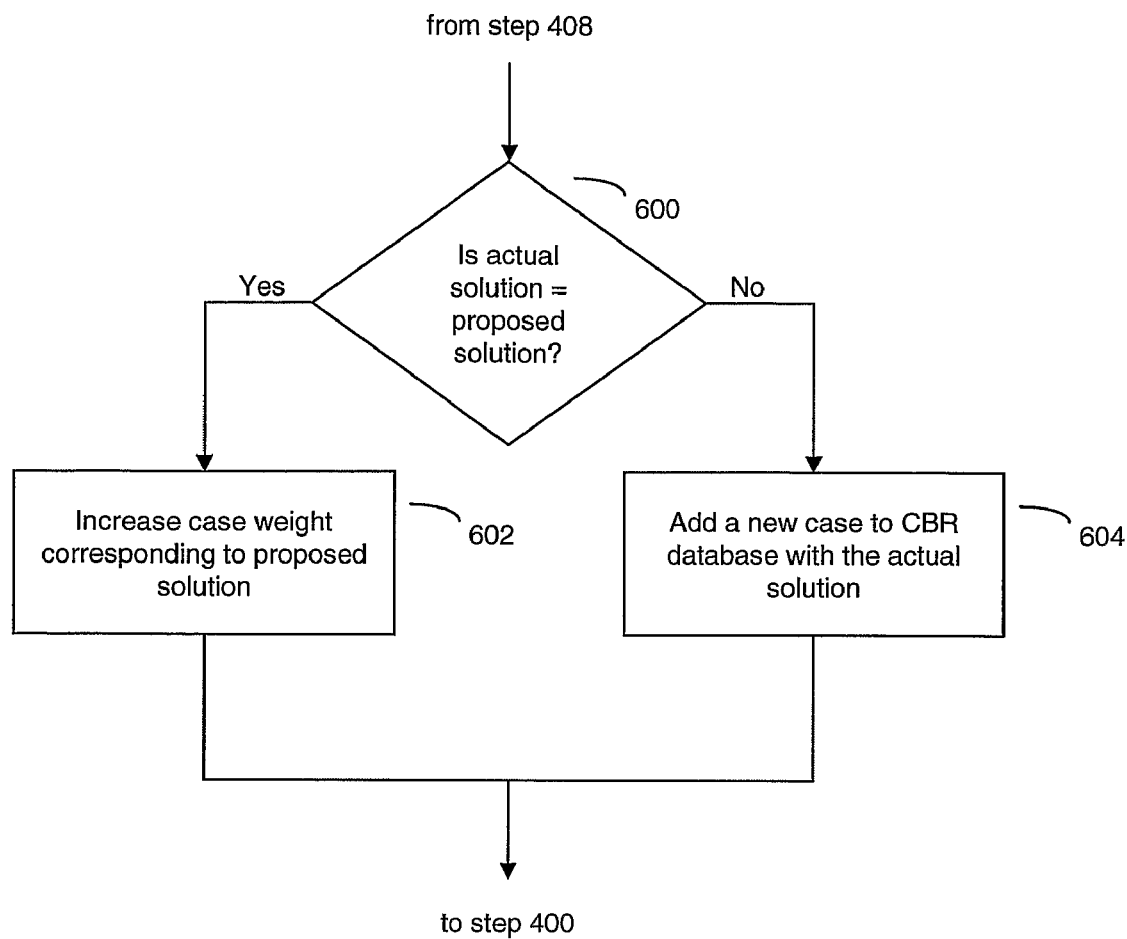
FIG. 6 is a flow diagram illustrating the maintenance of case data in an embodiment of the present invention.

The maintenance of the data in the diagnostic system is illustrated in the flow diagram of FIG. 6.

In FIG. 6, at step 600, a check is made to determine whether the actual solution applied by the user is the same as the one proposed by the diagnostic system.

If the actual solution is the same as the proposed solution, then processing moves to step 602, where the case weight associated with the proposed solution is automatically increased to reflect the fact that the solution was successful. For example, the increase may be an incremental increase of a counter if the case weight is a count of the number of times the solution has occurred.

However, if the actual solution is not the same as the proposed solution, then processing passes from step 600 to step 604, where the actual solution is added to the CBR database together with the case details to give a new case.

By adopting the above method of maintaining the diagnostic system, the data in the system gets "tuned", so that with repeated use, "golden" cases will start to dominate the data set.

Furthermore, the cases in the CBR database may be maintained further by applying a decay factor to the case weights, so that the strength or effect of a case and its solution reduces with time. Consequently, the diagnostic system can automatically "forget" cases that are too old to be relevant and allow them to be replaced by more recent and more relevant cases.

One example of a time decay function that could be used is an exponential decay function. This can be implemented by multiplying the daily, undecayed case weight by a multiplication factor of less than one. The multiplication factor can be stored in the CBR database. Therefore, over time, the case weight associated with a particular case fades away.

The simplest method for calculating the decayed case weight is exponential decay. Using this, the decayed case weight $S_W$ is given by $$S_W = \sum_{n=0}^{-\infty} M^n \cdot S_n \quad (1)$$

where $S_n$ is the daily case weight for the day n days before today, and M is a multiplier given by $$M = e^{\frac{-\ln(2)}{N}} \quad (2)$$

where N is the case half life in days, i.e. the number of days for the case weight to reach half of its original weight.

By application of this time decay function by the CBR processor, coupled with the reinforcement maintenance, the CBR database can be automatically maintained and kept up to date using existing live data.

Each day, the new decayed weight can be calculated by multiplying the previous day's decayed weight by M and then adding today's case score. Alternatively, the method above could be adapted so that the decaying occurs more or less regularly than every day. Of course, it should be appreciated that the decay can occur over steps of a sequence or a computing cycle.

FIG. 7 illustrates a table 700 showing more examples of cases 702 stored in the CBR database 104 and their associated solutions 704. Each case 702 has an associated case weight 706 and a decayed case weight 708. The case weight 708 can be an incremental count of the occurrences of a case as described above, and the decayed case weight 708 can be calculated in accordance with the methods described above. An effective decay factor 710 is also shown which gives an indication of the total amount of decay that has taken place.

The comments 712 column briefly summarises the distribution of cases based on the number of cases that have occurred or matched successfully. For example, for case 5, the case weight is 2000 and the decayed case weight is 1900. Therefore, case 5 can be considered as a case that has had lots of matches in total indicated by the relatively high case weight, and has also had lots of recent matches, as the decayed case weight is also high. Thus, the comment for case 5 reads "plenty of very recent cases". In contrast, case 10 has a case weight of 1250, which is relatively high, but a low decayed case weight of only 62.5, indicating very few recent matches for this case. As such, case 10 can be considered as a case which has had "plenty of very old cases".

The case weights shown in FIG. 7 are good examples of the data that can be maintained by the diagnostic system. However, when using decayed case weights, sometimes cases that have not had many recent matches but did have lots of matches in the past, and may therefore still be important cases, can be overlooked when decay is applied to the case weights. To help compensate for this and to allow older, but important cases, back into consideration, normalisation of the weighted scores with respect to the their solutions can be applied.

Normalisation begins by first calculating the sum of the case weights, decayed or undecayed, for each solution. The weighted case score for a case is then divided by the calculated sum that corresponds to the solution of that case. This is illustrated in FIG. 8, which shows a table 800 comprising each of the four solutions 704 from FIG. 7, together with the sum of their case weights 804 and sum of their decayed case weights 806. For example, the sum of the case weights for solution A is equal to 6000 calculated from the sum of the individual case weights of all the cases having solution A i.e. cases 1, 2, 3 and 4 (1500+600+2300+1600). Similarly, the sum of the decayed case weights for solution A is simply the sum of the individual decayed case weights of all the cases having solution A i.e. cases 1, 2, 3 and 4 (1050+150+115+1440=2755). These summed case weights are then used to normalise the weighted case scores, the results of which are shown in FIG. 9.

FIG. 9 illustrates a table 900 showing results of the case matching process during fault diagnostics. Input data is received by the CBR system and processed to determine case scores and weighted case scores in accordance with the steps illustrated in FIG. 5. Table 900 showing cases 702 with their associated solutions 704 and calculated case scores 904. The case scores 904 are calculated using the method as shown in step 518 of FIG. 5. The weighted case scores 906 are calculated by multiplying the case scores 904 by the case weights 706 as described in step 522 of FIG. 5. Similarly, the decayed weighted case scores 908 are calculated by multiplying the case score 904 by the decayed case weight 708.

The normalised weighted case scores 910 are calculated by dividing the weighted case scores 906 by the sum of the case weights 804 associated with the solution of the case. For example, the normalised weighted case score 910 for case 1 is 0.05, calculated by dividing the weighted case score, 300, by the sum of the case weight for solution A, 6000. Similarly, case 9 is 400/2550=0.156863.

The normalised decayed weighted case scores 912 are calculated in a similar manner to the normalised weighted case score 910, but the decayed weighted case scores 908 are used instead of the weighted case scores 906.

It can be seen from the results in table 900 that the highest scoring cases vary depending on whether the weighted case score 906, the decayed weighted case score 908, the normalised weighted case score 910, or the normalised weighted case score 912 are examined. Whilst applying decay to the case weights allows old cases that are less relevant to be forgotten, sometimes these old cases may still be very relevant and shouldn't be discarded altogether. Use of normalisation allows older, but relevant cases to be brought back into consideration, which is particularly important when applied to decayed weighted case scores.

As seen by looking at the decayed weighted case scores 908, case 5 is highest ranked, followed by case 4, then case 3. Therefore, the proposed solutions to the fault will be presented in the order solution B (case 5), followed by solution A (case 4), then solution C (case 9). This reflects the fact that case 5 had the highest decayed case weight compared to the other cases to start with and had plenty of recent cases. In contrast, case 10 is ranked very low based on its low decayed weighted case score compared with the other cases. Nevertheless, case 10 has a high case match score, indicating a good match with the fault, but its high case weight has been significantly reduced with time due to few recent matches. This situation is compensated by normalisation.

Referring now to the normalised decayed weighted case scores 912, the highest normalised decayed weighted case score 912 belongs to case 10, followed by case 5, then case 9. Thus the proposed solutions to the fault will be presented in the order of solution D (case 10), followed by solution B (case 5), then solution C (case 9). Thus, by applying normalisation to the decayed weighted case scores, cases which may be relevant are not rejected simply because they are old.

FIG. 10 illustrates a table 1000 similar to that of FIG. 9, but where the input data is from a different fault and hence the case match scores differ. The case match scores 1004 are low for the cases where there have been lots of old cases, and therefore the normalised decayed weighted case scores 1012 are less heavily biased towards the older but relevant cases when compared to the example shown in FIG. 9.

Any of the groups of weighted case scores 906, decayed weighted case scores 908, normalised weighted case scores 910 and normalised decayed weighted case scores 912 can be sorted as described in step 526 of FIG. 5 and their associated solutions presented as potential solutions by the CBR processor. They have all been shown in FIG. 9 for illustrative purposes, but the CBR processor could calculate a selection of the various groups of weighted scores or all of them depending on which ones are considered to be most appropriate given the situation.

In the examples described above, the CBR database could be implemented as a relational database such as an ORACLE relational database. A web based interface could be used to present the diagnostic system to a user, at the user output module 106 for instance, and using Java servlet technology for the creation of the web services interface (i.e. XML over HTTP). A person skilled in the art will recognise that the precise structure of the database as shown in the Figures is not important and that other variations are possible.

It is noted herein that while the above describes examples of the invention, there are several variations and modifications which may be made to the described examples without departing from the scope of the present invention as defined in the appended claims. One skilled in the art will recognise modifications to the described examples.

For example, the user input module may be omitted together with the user output module. Therefore, the entire diagnostic system could operate autonomously, detecting, diagnosing and fixing faults as they occur and without human intervention.

The invention claimed is:

1. A method of fault diagnostics in a case based reasoning system, wherein said case based reasoning system comprises a plurality of cases, each case having an associated solution and a case weight parameter indicative of the reliability of the associated solution, said method comprising the steps of:
   i) receiving data associated with a fault in a telecommunications network;
   ii) determining a case match score indicative of the degree of matching between the received data and each of the plurality of cases;
   iii) calculating a weighted case match score based on the case match score and the associated case weight parameter for each of the plurality of cases, and then providing a solution associated with one of the plurality of cases in dependence on the weighted case match scores and case weight;
   iv) receiving an actual solution to the fault, and
      a) increasing the case weight parameter of the case associated with the provided solution if the actual solution is equal to the provided solution; or
      b) adding a new case to the plurality of cases if the actual solution is not equal to the provided solution, wherein the actual solution is associated with the new case; and
   v) decaying over time the case weight parameters associated with each of the plurality of cases.

2. A method of fault diagnostics according to claim 1, wherein the decay over time is periodic.

3. A method of fault diagnostics according to claim 1, further comprising normalising the results from step ii).

4. A method of fault diagnostics according to claim 3, wherein the normalising comprises dividing the weighted case match score for a case by the sum of the all case weight parameters corresponding to the solution associated with said case.

5. A method of fault diagnostics according to claim 1, wherein steps i) to vi) are repeated.

6. A method of fault diagnostics according to claim 1, wherein the higher the weighted case match score of a case, the better the match between the case and the fault.

7. A case based reasoning system for fault diagnostics comprising a processor, an input module adapted for receiving data associated with a fault, storage means storing a plurality of cases, each case having an associated solution and a case weight parameter indicative of the reliability of the associated solution, wherein the processor is configured so as to perform:
   i) determining a case match score indicative of the degree of matching between the received data and each of the plurality of cases;
   ii) calculating a weighted case match score based on the case match score and the associated case weight parameter for each of the plurality of cases, and providing a solution associated with one of the plurality of cases in dependence on its weighted case match score;

iii) receiving an actual solution to the fault; and
   a) increasing the case weight parameter of the case associated with the provided solution if the actual solution is equal to the provided solution; or
   b) adding a new case to the plurality of cases if the actual solution is not equal to the provided solution, wherein the actual solution is associated with the new case; and iv) decaying over time the case weight parameters associated with each of the plurality of cases.

8. A system according to claim 7, wherein the decay over time is periodic.

9. The system according to claim 7, wherein the processor is further configured to normalize the results from step ii).

10. The system according to claim 9, wherein the normalizing comprises dividing the weighted case match score for a case by the sum of the all case weight parameters corresponding to the solution associated with said case.

11. The system according to claim 7, wherein the processor is further configured to repeat steps i) to vi).

12. The system according to claim 7, wherein the higher the weighted case match score of a case, the better the match between the case and the fault.

* * * * *